United States Patent
Heiler et al.

(10) Patent No.: US 6,693,550 B1
(45) Date of Patent: Feb. 17, 2004

(54) VISUALLY DISPLAYING STATUS INFORMATION IN AN ELECTRONIC SIGNALING SYSTEM

(75) Inventors: Richard Heiler, Folsom, CA (US); Mark Feuerstraeter, Fair Oaks, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/339,345

(22) Filed: Jun. 23, 1999

(51) Int. Cl.[7] .................................................. G08B 5/22
(52) U.S. Cl. ........................... 340/815.45; 340/815.52; 340/815.62; 370/426
(58) Field of Search ........................ 340/815.45, 815.4, 340/815.52, 815.62; 370/438, 426, 463

(56) References Cited

U.S. PATENT DOCUMENTS

| | | | |
|---|---|---|---|
| 5,163,690 A | * | 11/1992 | Davis et al. .................. 436/15 |
| 5,249,183 A | * | 9/1993 | Wong et al. ................. 370/228 |
| 5,390,129 A | * | 2/1995 | Rhodes ........................ 702/118 |
| 5,430,726 A | * | 7/1995 | Moorwood et al. ......... 370/438 |

* cited by examiner

Primary Examiner—Benjamin C. Lee
(74) Attorney, Agent, or Firm—Fish & Richardson P.C.

(57) ABSTRACT

A visual indicator array has (M×N)/2 pairs of indicator devices arranged in a two-dimensional, linear array having M rows and N columns, where M is an integer greater than or equal to two, and N is an integer greater than or equal to one. The array also includes M/2 enable lines, each of which is connected to all of the indicator devices in two of the M rows to deliver enable signals to the indicator devices in the two rows. Likewise, each of N status lines is connected to all of the indicator devices in one of the N columns. Status information is carried by M×N status signals, and each of N selectors is connected to a corresponding one of the status lines. Each of the N selectors receives M of the status signals and selectively applies the M status signals to the corresponding status line one at a time.

9 Claims, 3 Drawing Sheets

| CNTR | R1 | R2 | R3 | R4 |
|---|---|---|---|---|
| 111 | 1 | T | T | T |
| 110 | 0 | T | T | T |
| 101 | T | 1 | T | T |
| 100 | T | 0 | T | T |
| 011 | T | T | 1 | T |
| 010 | T | T | 0 | T |
| 001 | T | T | T | 1 |
| 000 | T | T | T | 0 |

… # VISUALLY DISPLAYING STATUS INFORMATION IN AN ELECTRONIC SIGNALING SYSTEM

TECHNICAL FIELD

This application relates to electronic signaling and, more particularly, to visually displaying status information in an electronic signaling system, such as those found in network repeaters and switches.

BACKGROUND

Many computer networks rely on repeaters to facilitate the exchange of information among the computers in the network. In many networks, such as Ethernet networks, information is exchanged in the form of data packets that pass through each of the repeaters in the network. The repeaters usually monitor the data packets to collect information on the status of network resources. Network administrators then use the status information to manage the network resources.

One way of conveying the status information from a repeater to a network administrator is through visual indicators, such as an array of light emitting diodes (LEDs). In general, each LED in the array is dedicated to presenting information about a particular status condition on a particular repeater port. The network administrator can determine whether a particular status condition exists on a status port by observing whether the corresponding LED in the array is illuminated. One problem with this technique is that additional pins must be added to the repeater chip to deliver status signals to the LED array, thus driving up the cost and complexity of the repeater chip.

Sophisticated techniques have been developed to reduce the number of signal lines required to drive an LED indicator array in a network repeater. One such technique is described in U.S. Pat. No. 5,598,418, in which a 16×5 array of LEDs provides information about five status conditions for each of sixteen repeater ports. The LED array is driven by eight time-multiplexed signals, each of which carries information about all five status conditions for two of the sixteen repeater ports. While this technique for driving the LED array succeeds in placing a great deal of information on very few status lines, the technique requires a relatively sophisticated multiplexing circuit in the repeater chip and an equally sophisticated demultiplexing scheme at the LED array. For example, this technique requires dual buffer circuits that operate alternately to decode the multiplexed status signals. Moreover, this technique still requires one pin for each repeater port and one pin for each status condition for which information is provided. For a 16×5 array, the repeater chip must include twenty-one additional pins.

SUMMARY

The invention provides a simple solution for driving an indicator array with relatively few signal lines from a repeater chip. The indicators are arranged so that a single status line can drive a pair of rows (or columns). As a result, the number of pins dedicated to driving the rows (or columns) of the indicator array is no more than one-half of the number of rows (or columns) in the array. For example, a repeater implementing the invention can drive a 16×5 array with only thirteen dedicated pins (8×5). Moreover, the invention allows the use of standard selector circuits and a relatively simple row selection circuit in driving the indicator array.

In one aspect, the invention involves visually presenting status information from an electronic signaling system, such as those often found in network repeaters and switches. At least one pair of visual indicator devices (e.g., LEDs arranged to conduct in opposite directions) provides the visual information. An enable line is connected to both LEDs in the pair to deliver an enable signal directly to the LEDs. A status line also is connected to both LEDs in the pair. A selector circuit receives at least two status signals containing status information and then selectively applies the status signals to the status line.

In some embodiments, one of the LEDs in each pair conducts only when the enable signal has a high value, and the other LED conducts only when the enable signal has a low value. For example, the LEDs operate in this manner when the cathode of each LED in a pair is connected to the anode of the other LED in the pair. In other embodiments, the selector circuit selects the status signals one at a time.

Some embodiments include at least one additional pair of indicator devices connected to the enable line and another status line connected to both indicator devices in the additional pair. Some of these embodiments include an additional selector circuit that receives at least two additional status signals containing status information and then selectively applies the additional status signals to the additional status line.

Other embodiments include at least one additional pair of indicator devices connected to the status line and another enable line connected to both indicator devices in the additional pair. The additional enable line delivers another enable signal directly to the additional indicator devices.

Still other embodiments include an enable circuit that generates the enable signal such that each of the indicator devices in the pair is enabled when the selector circuit applies a corresponding one of the status signals to the status line. Some embodiments include a logic circuit having inputs coupled to the enable line and the selector circuit and having an output that drives the status line. The logic circuit often consists of an XOR gate.

In another aspect, the invention features an electronic signaling system that includes at least two status condition lines to carry status information. A visual indicator array having at least one pair of indicator devices, such as LEDs, displays the status information visually. An enable line is connected to both of the LEDs in the pair to deliver an enable signal directly to the LEDs. A status line also connects to both LEDs in the pair. A selector circuit is coupled to the status condition lines to selectively apply the status information to the status line.

In some embodiments, the signaling system includes at least two ports for which status information is generated, and each of the LEDs in a pair is dedicated to displaying status information for a corresponding one of the ports. In some cases, the LEDs are arranged SO that one of the LEDs provides a visual output only when the enable signal has a high value and a status signal associated with the corresponding port has a high value. In these cases, the other LED provides a visual output only when the enable signal has a low value and a status signal associated with the corresponding port has a high value.

In another aspect, the invention features a visual indicator array having (M×N)/2 pairs of indicator devices arranged in a two-dimensional, linear array having M rows and N columns, where M is an integer greater than or equal to two, and N is an integer greater than or equal to one. The array also includes M/2 enable lines, each of which is connected to all of the indicator devices in two of the M rows to deliver enable signals to the indicator devices in the two rows. Likewise, each of N status lines is connected to all of the indicator devices in one of the N columns. Status information is carried by M×N status signals, and each of N selectors is connected to a corresponding one of the status lines. Each of the N selectors receives M of the status signals and selectively applies the M status signals to the corresponding status line one at a time.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference numbers and designations in the various drawings indicate like elements.

DETAILED DESCRIPTION

Figure 1:
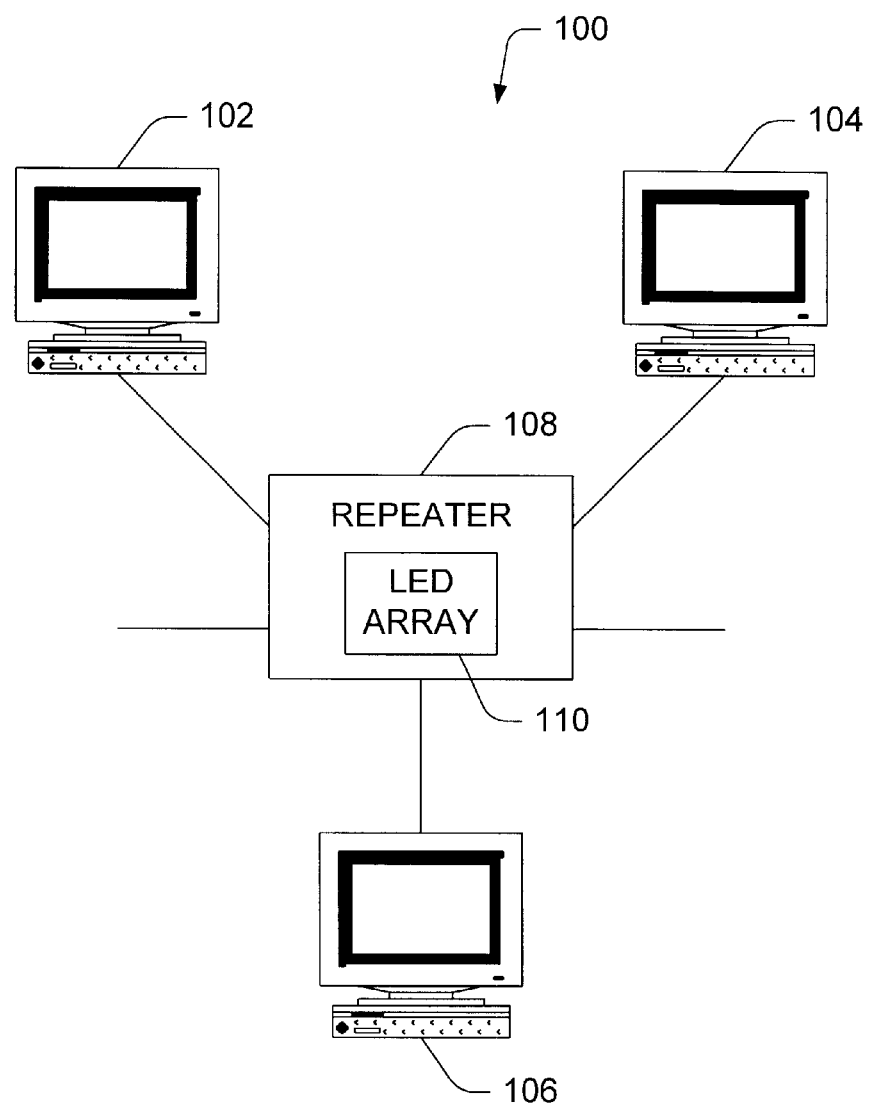
FIG. 1 is schematic diagram of a computer network with several workstations connected to a repeater.

FIG. 1 shows a computer network 100 in which several computers 102, 104, 106 are connected to a repeater 108. The repeater 108 includes multiple ports, at least one of which receives data packets from the computers 102, 104, 106, and at least one of which distributes the data packets throughout the network 100. The repeater 108 also includes, or is linked to, a visual display 110, such as an LED array, that provides a visual indication of various status conditions monitored by the repeater 108. In general, the visual display 110 responds to status information collected by the repeater 108 from the data packets. The repeater 108 usually collects information about one or more particular status conditions for each of the ports through which data packets travel. For example, a particular repeater might monitor eight status conditions for each of eight repeater ports, thus producing sixty-four separate status indicators. Examples of status conditions monitored for individual ports include the standard LINK, PARTITION, ISOLATE, PORT ENABLED, and COLLISION conditions. In some cases, the repeater also monitors status conditions that do not apply to particular ports, but rather apply to the repeater as a whole. Examples of conditions monitored for the repeater as a whole include the RPS FAULT, GLOBAL SECURITY, GLOBAL FAULT, and GLOBAL COLLISION conditions. Some repeaters also use the indicator array to provide graphical information, such as 10M and 100M activity bar graphs.

Figure 2:
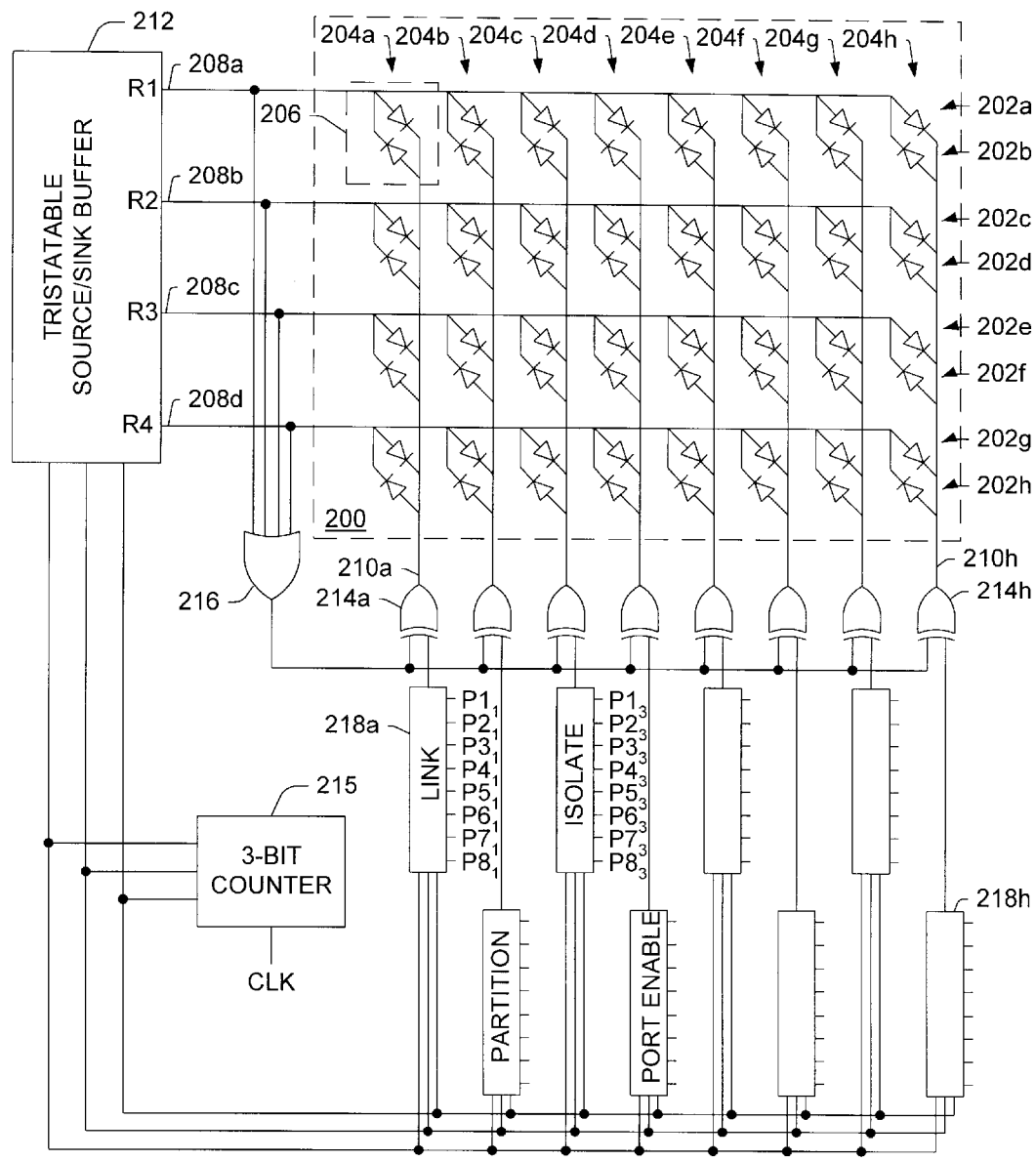
FIG. 2 is a schematic diagram of a repeater status indicator array with driving circuitry.

FIG. 2 shows one implementation of the visual display 110 and driving circuitry for an 8-port repeater that monitors eight port-specific status conditions. In this implementation, the visual display includes an 8×8 array 200 of sixty-four LEDs, each of which is dedicated to providing information about a particular status condition for one of the repeater ports. The LEDs are arranged in eight rows 202a–h and eight columns 204a–h. Each of the rows 202a–h is dedicated to providing status information for a particular one of the repeater ports (e.g., port 1), and each of the columns 204a–h is dedicated to providing information about a particular one of the status conditions (e.g., LINK) for all of the ports.

The LEDs in the array 200 are arranged in pairs, where each pair 206 includes LEDs lying in two adjacent rows, such as the top two rows 202a, 202b. The LEDs in each pair 206 are arranged such that the cathode of each LED connects to the anode of the other LED in the pair 206. This arrangement ensures that the LEDs in each pair 206 conduct in opposite directions and at different times, the reasons for which are discussed below.

The drive circuitry for the indicator array 200 includes one row signal line ("row line") for every two repeater ports, yielding four such row lines 208a–d in the example shown. The drive circuitry also includes one column signal line ("column line") for every type of status condition monitored, yielding eight such column lines 210a–h in the example shown. Each of the row lines 208a–d connects to all of the LEDs in two of the indicator rows 202a–h, and each of the column lines 210a–h connects to all of the LEDs in one of the indicator columns 204a–h. For example, the first row line 208a connects to the first two rows 202a, 202b; the second row line 208b connects to the next two row lines, 202c, 202d; and so on. This arrangement ensures that both LEDs in each pair 206 are driven by a single one of the row lines 208a–d and a single one of the column lines 210a–h. As a result, a repeater chip that includes the drive circuitry needs only twelve additional pins to deliver the signals to the 8×8 indicator array 200.

The row lines 208a–d are driven by a buffer circuit 212 that is capable of sinking and sourcing current in each row line, as well as providing a high impedance ("tristate") output to each row line. Each output line R1, R2, R3, R4 of the buffer circuit 212 provides a periodic signal that has three periods: (1) a current-source period during which the output line has a high logic value and sources current through the LEDs in one of the rows 202a–h; (2) a current-sink period during which the output line has a low-logic value and sinks current from the LEDs in one of the rows 202a–h; and (3) a tristate period during which the output line goes high impedance and thus disables the LEDs in the corresponding rows. The output lines R1–R4 transition through these three states in response to a signal provided by a binary counter 215, which in this example is a 3-bit counter configured to count down repeatedly from binary seven ("111") to binary zero ("000"). The binary counter 215 is driven by the pulses of a clocking signal CLK. In general, the counter 215 cycles through two states for each of the row lines 208a–d.

Figures 3A, 3B:
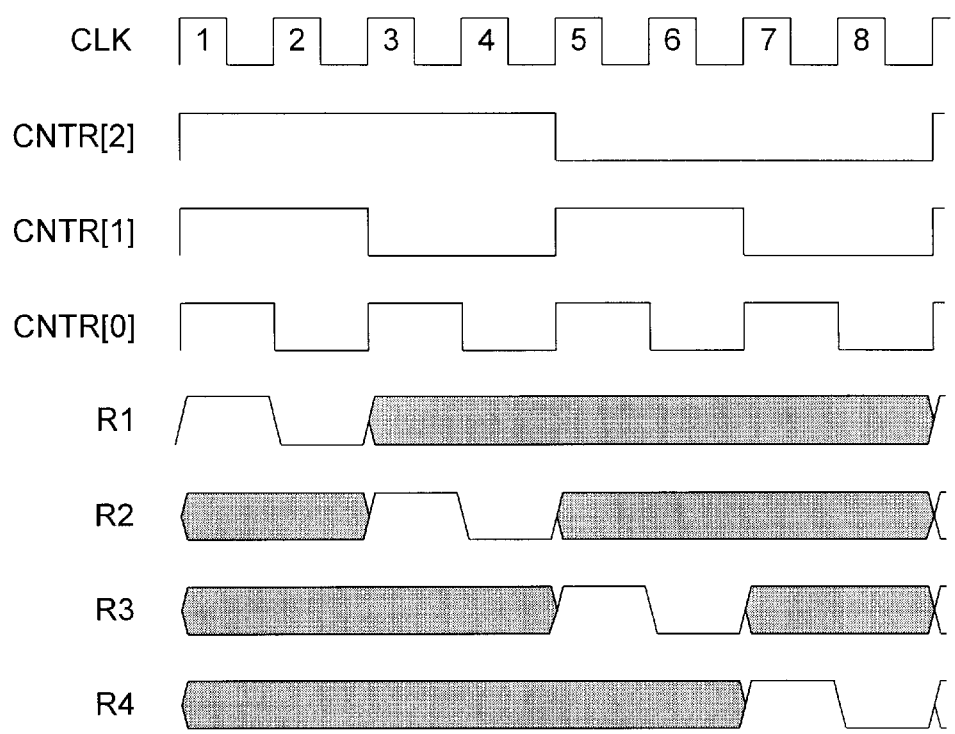
FIGS. 3A and 3B are a table and a timing diagram showing the signals that drive the indicator array of FIG. 2.

FIGS. 3A and 3B show the states and the timing through which the output lines R1–R4 and the binary counter 215 cycle in response to the clocking signal CLK. The two highest order bits from the counter select one of the four output lines R1–R4, and the lowest order bit determines whether the selected output line has a high logic value or a low logic value, i.e., whether that output line sources or sinks current. The three unselected output lines all go high impedance and thus neither source nor sink current in the corresponding indicator rows.

During an initial period of the clocking signal, the counter outputs the binary value "111", which selects the first output line R1 and causes this line to output a high logic value. As a result, the first output line R1 is configured to source current to the LEDs in the first row 202a during this clocking period. All of the other output lines R2–R4 provide high impedance outputs during this clocking period.

On the next clock pulse, the counter 215 decrements to the value "110", which causes the first output line R1 to transition to a low logic value. As a result, the first output line R1 stops sourcing current and begins sinking current from LEDs in the second row 202b, if any of these LEDs are to illuminate. The other output lines R2–R4 continue to provide high impedance outputs during this clocking period.

The next pulse of the clocking signal causes the counter 215 to decrement to the value "101", which deselects the first output line R1 and selects the second output line R2. The second output line R2 outputs a high logic value during this clocking period and thus is capable of sourcing current to the LEDs in the third row 202c. All other output lines R1, R3–R4 provide high impedance outputs during this clocking period.

On the next clock pulse, the second output line R2 transitions to a low-logic value and begins sinking current from LEDs in the fourth row 202d, if any of these LEDs are to illuminate. This cycle continues with each successive pulse of the clocking signal until all four output lines have been selected and have transitioned from current source mode to current sink mode. The cycle repeats itself every eight pulses of the clocking signal.

The column lines 210a–h in FIG. 2 are driven by a group of buffers that, like the buffer circuit 215, are capable of sinking and sourcing current through the LEDs. One way of implementing these buffers is with logic gates that source current to the LEDs when outputting high logic values and that sink current from the LEDs when outputting low logic values. The depicted embodiment uses exclusive-OR (XOR) gates 214a–h, which output low logic values when presented with two inputs having the same logic value (low-low or high-high) and that output high logic values otherwise. Each of the XOR gates 214a–h receives input from two sources: (1) an OR gate 216 that is driven by the output lines R1–R4 of the buffer circuit 212, and (2) one of a group of selector circuits 218a–h.

Each of the selector circuits 218a–h receives several status condition signals generated by the repeater. In this example, eight selector circuits 218a–h receive a total of sixty-four status condition signals (P1$_1$ ... P1$_8$, P2$_1$ ... P2$_8$, ..., P8$_1$ ... P8$_8$). Each of the status condition signals represents one of the eight status conditions for one of the eight repeater ports, indicating whether the corresponding status condition exists on the corresponding repeater port during each period of the clocking signal CLK. Each of the selector circuits 218a–h receives a total of eight status condition signals, one for each of the eight ports. In general, all of the signals received by one selector circuit represent a particular one of the status conditions. For example, the first selector circuit 218a in this example receives only those signals that indicate the status of the LINK condition for the eight repeater ports.

The selector circuits also receive the 3-bit signal from the binary counter 215 as a control input. Each selector circuit uses the 3-bit signal to select one of the eight received status condition signals on each pulse of the clocking signal.

The clocking signal CLK and the binary counter 215 ensure that the status condition signals selected by the selector circuits 218a–h are synchronized with the signals on the output lines R1–R4 of the buffer circuit 212. An LED illuminates only if the corresponding status signal is asserted while the LED is enabled by the buffer circuit 212. The upper LED in each pair 206 is enabled when the corresponding output line R1–R4 of the buffer circuit 212 has a high logic value. In this situation, the OR gate 216 provides a high input to each of the XOR gates 214a–h. If the status signal corresponding to the upper LED in each pair 206 is asserted, the corresponding XOR gate outputs a low logic value, and the upper LED is biased to conduct. The buffer circuit 212 sources current to the upper LED, and the XOR gate sinks this current. On the other hand, if the status signal corresponding to the upper LED is not asserted, both the buffer circuit and the XOR gate output high logic values, and the upper LED does not conduct.

The lower LED in each pair 206 is enabled when the corresponding output line R1–R4 of the buffer circuit has a low logic value. In this situation, the OR gate 216 provides a low input to the XOR gates 218a–h. If the status signal corresponding to the lower LED is asserted, the corresponding XOR gate outputs a high logic value, and the lower LED is biased to conduct. The XOR gate sources current to the lower LED, and the buffer circuit sinks this current. If the status signal corresponding to the lower LED is not asserted, both the XOR gate and the buffer circuit 212 output low logic values, and the lower LED does not conduct.

In this example, the duty cycle of each LED is no greater than one period of the 3-bit counting signal, i.e., no greater than 12.5% (⅛). Therefore, the frequency of the clocking signal is selected so that the LEDs illuminate frequently enough to ensure detection by the human eye. In most cases, the frequency of the clocking signal is so great that the human eye detects little, if any, flicker in the illuminated LEDs.

A number of embodiments of the present invention have been described. Nevertheless, it will be understood that various modifications are possible without departing from the spirit and scope of the invention. For example, while the example above focuses on a repeater that monitors several port-specific status conditions for each of several repeater ports, the invention is just as useful in displaying status information that applies to the repeater as a whole. The invention also is useful in displaying a wide variety of graphical information, such as bar graphs generated from statistics gathered over time or over multiple repeater ports. Moreover, while the terms "row" and "column" have been used above in the traditional sense to describe horizontal and vertical lines, respectively, these terms apply more generically to any pair of lines that run in different directions. For example, in some implementations, the indicator array is diamond-shaped, and the rows and columns both extend diagonally. These terms also can be used in a manner opposite to their usage here, i.e, the term "column" can be used to describe a horizontal line of indicators, and the term "row" can be used to describe a vertical line of indicators. The invention also applies to repeaters and switches having any number of ports and monitoring any number of status conditions simply by adding or subtracting counter states, selector circuits, tristatable buffers, status signals, and LEDs. Accordingly, other embodiments are within the scope of the following claims.

What is claimed is:

1. A visual indicator array comprising:
   (a) (M×N)/2 pairs of indicator devices arranged in a two-dimensional, linear array having M rows and N columns, where M is an integer greater than or equal to two, and N is an integer greater than or equal to two;
   (b) M/2 enable lines, each connected to all of the indicator devices in two of the M rows to deliver enable signals to the indicator devices in the two rows;
   (c) N status lines, each connected to all of the indicator devices in one of the N columns;
   (d) M×N status signals containing status information to be displayed visually by the indicator devices;
   (e) N selectors, each of which is connected to a corresponding one of the status lines and is configured to:

(1) receive M of the status signals; and
(2) selectively apply the M status signals to the corresponding status line one at a time; and
(f) a buffer circuit that drives one of the M/2 enable lines at a time,
wherein, for each of the M/2 enable lines, the buffer circuit is configured to sink current for some portion of a timing cycle, to source current for some portion of the timing cycle, and to provide a high impedance output for the remainder of the timing cycle, and
wherein the buffer circuit and selectors are operative to activate multiple indicators connected to one of said enable lines simultaneously in response to multiple corresponding status signals when the buffer circuit sources or sinks current to said enable line.

2. The array of claim 1, wherein the indicator devices in each of the M rows are dedicated to displaying status information relating to a corresponding port of a network repeater or switch.

3. The array of claim 1, wherein the indicator devices in each of the N columns are dedicated to displaying status information relating to a corresponding status condition for multiple ports of a network repeater or switch.

4. The array of claim 1, wherein the buffer circuit is configured to provide a high impedance output for all but one of the M/2 enable lines at all times.

5. An apparatus comprising:
a plurality of LED pairs, each LED pair including a first node coupled to the anode of a first LED in the pair and the cathode of a second LED in the pair and a second node coupled to the cathode of the first LED and the anode of the second LED;
a plurality of row lines, each row line coupled to the first node of each of a plurality of LED pairs in a row;
a plurality of column lines, each column line coupled to the second node of each of a plurality of LED pairs in a column;
a buffer coupled to each of the row lines and for each row line operative to supply a logical HIGH signal in a first half of a row enable cycle corresponding to one of said row lines, a logical LOW signal in a second half of said row enable cycle, and a high impedance when said row line is disabled; and
a plurality of selectors, each selector coupled to a corresponding one of said column lines and operative to supply a logical LOW signal in the first half of said row enable cycle in response to a status signal corresponding to a first status condition and a logical HIGH signal in the second half of said row enable cycle in response to a status signal corresponding to a second status condition.

6. The apparatus of claim 5, wherein each row has a corresponding row enable cycle in which the other rows are disabled.

7. The apparatus of claim 5, wherein the buffer and selectors are operative to active multiple LEDs in a row simultaneously in a row enable cycle in response to a plurality of status signals corresponding each of a plurality of status conditions.

8. The apparatus of claim 5, wherein each of the LEDs are dedicated to displaying status information relating to a corresponding port of a network repeater or switch.

9. The apparatus of claim 5, wherein the first device and the second device.

* * * * *